(12) United States Patent
Chen et al.

(10) Patent No.: US 7,831,388 B2
(45) Date of Patent: Nov. 9, 2010

(54) ACCURATE POSITIONING SYSTEM FOR A VEHICLE AND ITS POSITIONING METHOD

(75) Inventors: Kuo-Rong Chen, Panchiao (TW); Chun-Chung Lee, Taipei (TW); Ming-Wen Yang, Sinjhuang (TW)

(73) Assignee: Sin Etke Technology Co., Ltd., Taipei (TW)

( * ) Notice: Subject to any disclaimer, the term of this patent is extended or adjusted under 35 U.S.C. 154(b) by 973 days.

(21) Appl. No.: 11/651,992

(22) Filed: Jan. 11, 2007

(65) Prior Publication Data
US 2008/0082265 A1 Apr. 3, 2008

(30) Foreign Application Priority Data
Sep. 15, 2006 (TW) .............. 95134213 A

(51) Int. Cl.
G06F 19/00 (2006.01)
H04B 7/185 (2006.01)
(52) U.S. Cl. .............. 701/216; 701/217; 342/457
(58) Field of Classification Search .............. 701/216, 701/217, 220, 213, 214, 215; 342/357.14, 342/457, 357.02; 702/92, 94; 73/178 R; 340/988
See application file for complete search history.

(56) References Cited
U.S. PATENT DOCUMENTS

| | | | | |
|---|---|---|---|---|
| 4,321,678 A | * | 3/1982 | Krogmann | 701/220 |
| 5,525,998 A | * | 6/1996 | Geier | 342/357.14 |
| 5,745,868 A | * | 4/1998 | Geier | 701/216 |
| 6,029,111 A | * | 2/2000 | Croyle | 701/207 |
| 6,047,234 A | * | 4/2000 | Cherveny et al. | 701/200 |
| 6,091,359 A | * | 7/2000 | Geier | 342/357.14 |
| 6,453,238 B1 | * | 9/2002 | Brodie et al. | 701/216 |
| 6,643,587 B2 | * | 11/2003 | Brodie et al. | 701/216 |
| 2002/0128775 A1 | * | 9/2002 | Brodie et al. | 701/216 |
| 2005/0057372 A1 | * | 3/2005 | Taylor | 340/901 |
| 2006/0212194 A1 | * | 9/2006 | Breed | 701/29 |
| 2007/0262881 A1 | * | 11/2007 | Taylor | 340/905 |

* cited by examiner

Primary Examiner—Ronnie Mancho
(74) Attorney, Agent, or Firm—Bacon & Thomas, PLLC

(57) ABSTRACT

An accurate positioning system installed in a vehicle is disclosed to include a GPS, a Gyro sensor, a vehicle speedometer, and a controller. When the GPS outputs a next GPS coordinates, the controller calculates a next reference coordinates subject to the azimuth signal outputted from the Gyro sensor and the vehicle speed signal outputted from the vehicle speedometer and calculates the distance between the next GPS coordinates and the next reference coordinates, and then assigns the GPS coordinates to be the next accurate coordinates for output when the distance between the next GPS coordinates and the next reference coordinates surpasses a reference distance, or assigns the next reference coordinates to be the next accurate coordinates for output when the distance between the next GPS coordinates and the next reference coordinates is smaller than or equal to the reference distance.

15 Claims, 5 Drawing Sheets

| GPS | GYRO+Speed $\theta$ $\quad$ V | A | |
|---|---|---|---|
| $P_m$ | | $A0=P_m$ | $t_0$ |
| | $G1=P_m+f(V_1, \theta_1)$ | $A1=G1$ | $t_1$ |
| | $G2=A1+f(V_2, \theta_2)$ | $A2=G2$ | $t_2$ |
| | $G3=A2+f(V_3, \theta_3)$ | $A3=G3$ | $t_3$ |
| $P_{m+1}, d>r$ | $G4=A3+f(V_4, \theta_4)$ | $A4=P_{m+1}$ | $t_4$ |
| | $G5=A4+f(V_5, \theta_5)$ | $A5=G5$ | $t_5$ |
| | $G6=A5+f(V_6, \theta_6)$ | $A6=G6$ | $t_6$ |
| | $G7=A6+f(V_7, \theta_7)$ | $A7=G7$ | $t_7$ |
| $P_{m+2}, d \leq r$ | $G8=A7+f(V_8, \theta_8)$ | $A8=G8$ | $t_8$ |
| | $G9=A8+f(V_9, \theta_9)$ | $A9=G9$ | $t_9$ |
| | $G10=A9+f(V_{10}, \theta_{10})$ | $A10=G10$ | $t_{10}$ |
| $\vdots$ | $\vdots$ | $\vdots$ | $\vdots$ |

$P_m$
$\quad m=0, 1, 2, 3, \ldots n$ $$G_i = A_{i-1} + f(V_i, \theta_i)$$
$$i = 2, 3, 4, \ldots j$$

FIG. 3

ACCURATE POSITIONING SYSTEM FOR A VEHICLE AND ITS POSITIONING METHOD

BACKGROUND OF THE INVENTION

1. Field of the Invention

The present invention relates to the vehicle positioning technology and more particularly, to an accurate positioning system for a vehicle and its positioning method.

2. Description of Related Art

FIG. 1 is a schematic drawing showing a car equipped with a GPS navigation system. As illustrated, the GPS navigation system comprises a GPS (Global Position System) 81 and a navigation device 82. The GPS 81 is adapted to receive and analyze signals from multiple GPS satellites to determine the co-ordinates data of the car. The microprocessor 821 of the navigation device 82 compares the co-ordinates data obtained from the GPS 81 with its built-in electronic map database (e-Map database) 822, thereby determining the location of the car on the earth and showing a sign representing the car on the map that is displayed on the display 83 corresponding to the location of the car on the earth to help the driver navigate the car.

The GPS 81 receives and analyzes signals from multiple GPS satellites to determine the co-ordinates data of the car, and outputs the co-ordinates data of the car once per second. However, when the car is running at a high speed, the long time interval of outputting the co-ordinates data of the car once per second may result in a big error. If the microprocessor 821 compares the inaccurate co-ordinates data of the car to the built-in electronic map database 822, the microprocessor 821 will allocate the sign representing the car on the map at an inaccurate location and thus give a wrong navigation. Further, when the car passes along a tunnel, the GPS 81 cannot receive signals from the GPS satellites and will output inaccurate co-ordinates data, thereby causing the car to be unable to obtain the accurate position. Therefore, there is still room for improvement in the GPS devices for determining vehicle location.

SUMMARY OF THE INVENTION

The present invention has been accomplished under the circumstances in view. It is therefore the main object of the present invention to provide an accurate positioning system for a vehicle and its accurate positioning method, which eliminates the big error problem of the prior art GPS navigation system resulting from the long time interval of outputting vehicle coordinates data once per second during a high speed running, enabling the vehicle carrying the precision vehicle position system of the present invention to obtain the accurate position. It is another object of the present invention to provide an accurate positioning system for a vehicle and its accurate positioning method, which eliminates the problem of providing an error position data of the prior art GPS navigation system when it is unable to receive GPS satellite signals.

To achieve these and other objects of the present invention, the accurate positioning system is installed in a vehicle, comprising a GPS (Global Positioning System), a Gyro sensor, a vehicle speedometer, and a controller.

The GPS outputs the current GPS coordinates of the vehicle once per every first time interval. The Gyro sensor outputs an azimuth indicative of the current heading direction of the vehicle. The vehicle speedometer outputs a vehicle speed signal indicative of the current speed of the vehicle. The controller is respectively and electrically connected to the GPS, the Gyro sensor and the vehicle speedometer. The controller obtains the azimuth from the Gyro sensor and the vehicle speed signal from the vehicle speedometer and reads in the GPS coordinates from the GPS, calculates reference coordinates of the vehicle subject to the data of the fetched azimuth, vehicle speed signal and GPS coordinates, and assigns the reference coordinates thus calculated to be the accurate coordinates at the corresponding time point for output. The controller also obtains the azimuth from the Gyro sensor and the vehicle speed signal from the vehicle speedometer and reads in last accurate coordinates once per every second time interval that is shorter than the first time interval, calculates reference coordinates of the vehicle subject to the data of the obtained azimuth, vehicle speed signal and last accurate coordinates, and assigns the reference coordinates thus calculated to be the accurate coordinates at the corresponding time point for output. After the GPS has outputted the following GPS coordinates as the first time interval has expired, the controller calculates the next reference coordinates of the vehicle and the distance between the next GPS coordinates and the next reference coordinates, and then compares the distance between the next GPS coordinates and the next reference coordinates to a reference distance, and then assigns the next GPS coordinates to the accurate coordinates for output when the distance between the next GPS coordinates and next reference coordinates is greater than the reference distance, or assigns the next reference coordinates to be the accurate coordinates for output when the distance between the next GPS coordinates and next reference coordinates is smaller than the reference distance.

To achieve these and other objects of the present invention, the accurate positioning method comprises the steps of: A) obtaining an azimuth of the heading direction of a vehicle, a vehicle speed signal and a GPS coordinates, wherein the azimuth is outputted by a Gyro sensor installed in the vehicle; the vehicle speed signal is outputted by a vehicle speedometer installed in the vehicle; the GPS coordinates are outputted by a GPS (Global Positioning System) installed in the vehicle once per every first time interval; B) calculating the reference coordinates of the vehicle and assigning the reference coordinates to be the accurate coordinates at the corresponding time point, and outputting the accurate coordinates; C) obtaining the azimuth of the currently heading direction of the vehicle from the Gyro sensor and the vehicle speed signal from the vehicle speedometer and reading in the last accurate coordinates once per every second time interval, wherein the second time interval is shorter than the first time interval; D) calculating the reference coordinates of the vehicle and assigning the calculated reference coordinates to be the current accurate coordinates of the vehicle, and outputting the current accurate coordinates; E) calculating the next reference coordinates of the vehicle after the GPS has outputted the next GPS coordinates as the first time internal has expired, and then calculating the distance between the next GPS coordinates and the next reference coordinates; and F) comparing the distance between the next GPS coordinates and the next reference coordinates to a reference distance to be greater or smaller than the reference distance, and assigning the next GPS coordinates to be the next accurate coordinates and outputting the next accurate coordinates when the distance between the next GPS coordinates and the next reference coordinates is greater than the reference distance.

BRIEF DESCRIPTION OF THE DRAWINGS

FIG. 3 shows the content of the coordinates of the accurate positions of the vehicle calculated by the controller at different time points in accordance with the present invention.

DETAILED DESCRIPTION OF THE PREFERRED EMBODIMENT

Figure 1:
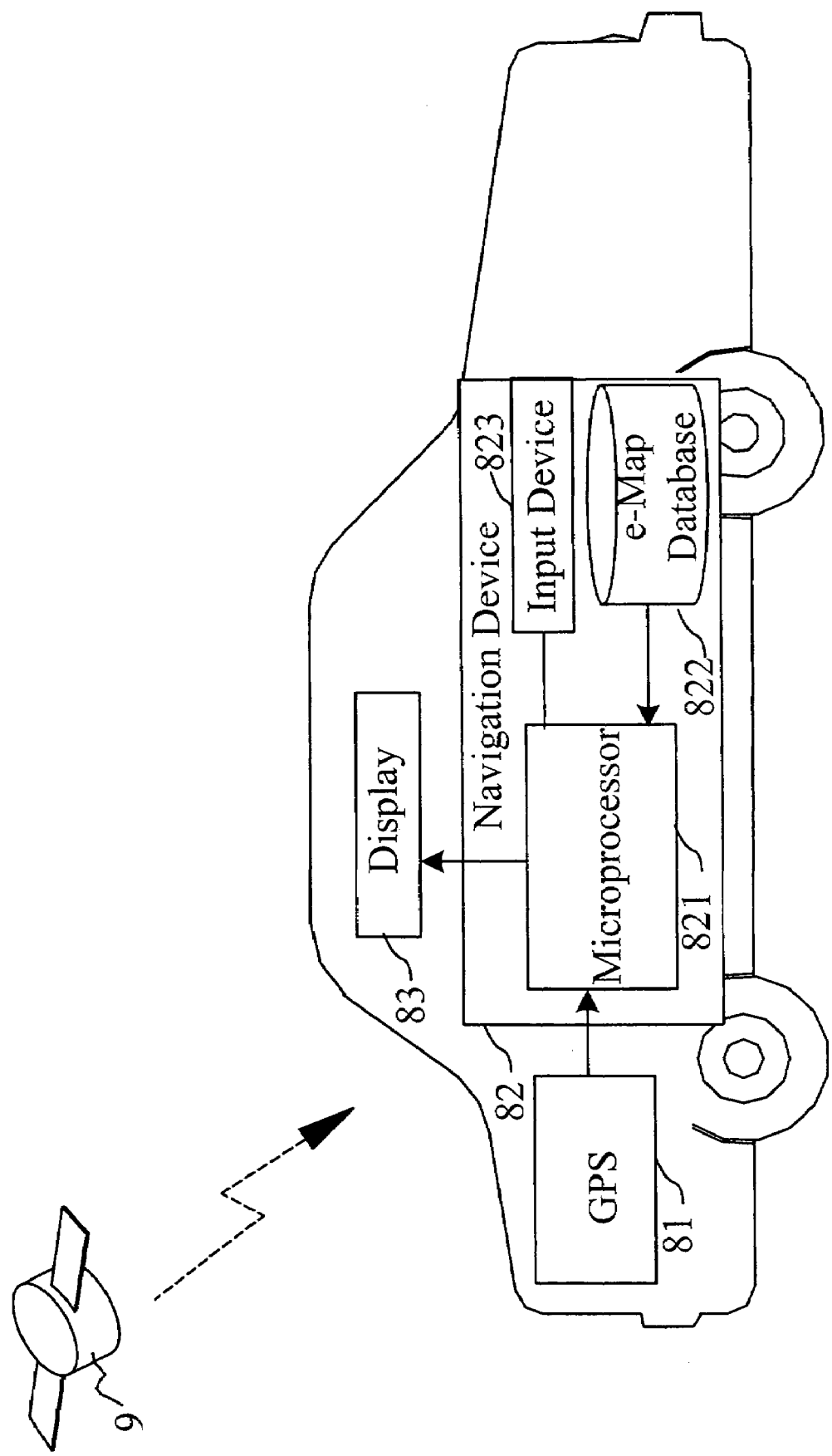
FIG. 1 is a schematic drawing showing a car equipped with a GPS navigation system in accordance with the prior art.
Figure 2:
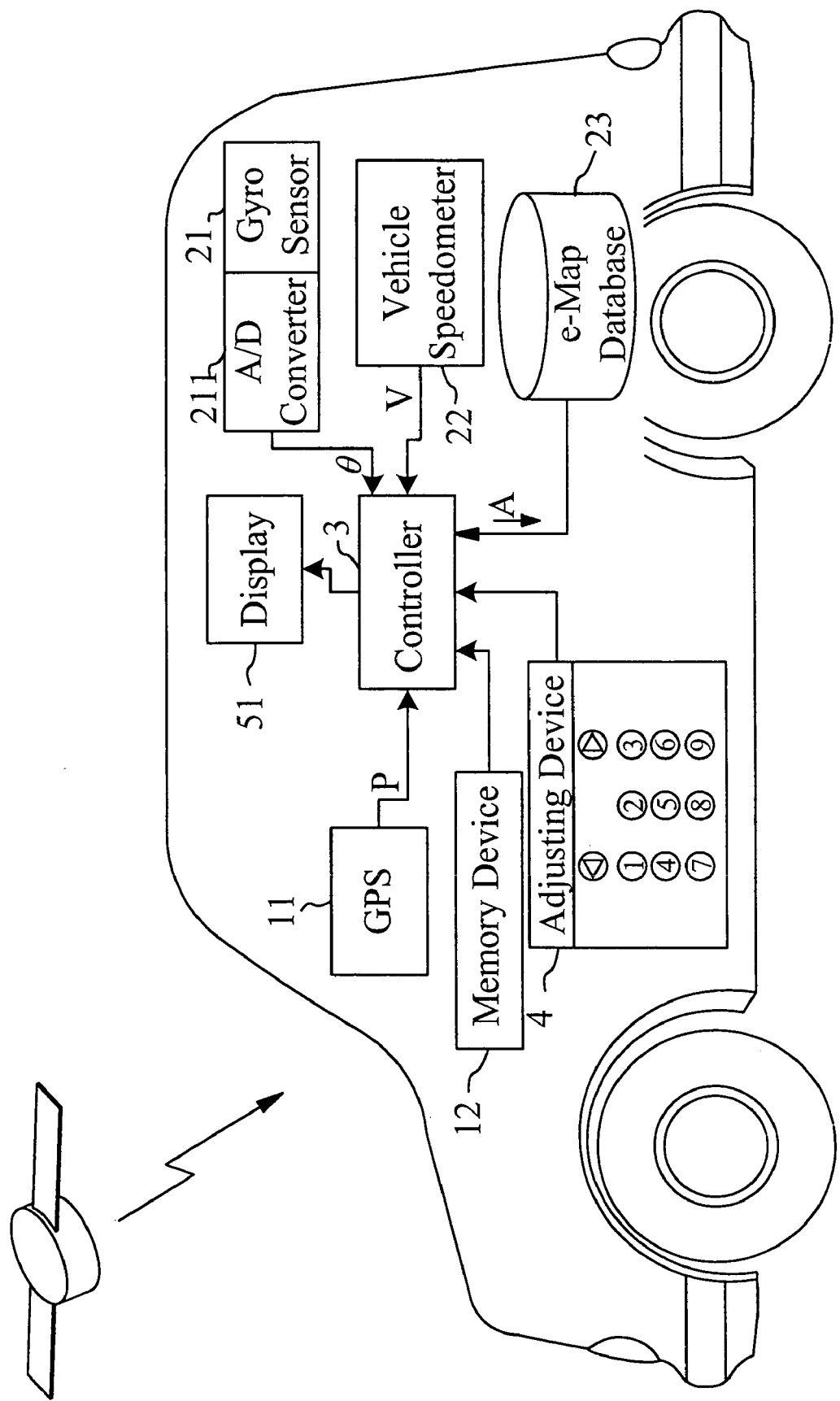
FIG. 2 is a system block diagram of an accurate positioning system in accordance with the present invention.

The invention relates to an accurate positioning system for a vehicle. The accurate positioning system is installed in a vehicle M to provide accurate position to the vehicle M in real time. FIG. 2 is a system block diagram of the accurate positioning system. As illustrated, the accurate positioning system comprises a GPS (Global Positioning System) 11, a Gyro sensor 21, a vehicle speedometer 22, a controller 3, a display 51, a memory device 12, and adjusting device 4, an A/D converter 211, and an electronic map database (e-Map database) 23. The GPS 11 outputs the current GPS coordinates P of the vehicle M at every first time interval T. According to this embodiment, the first time interval T is one second. The Gyro sensor 21 frequently outputs an azimuth indicating the currently heading direction of the vehicle M relative to the global coordinate system.

The A/D converter 211 is electrically connected between the Gyro sensor 21 and the controller 3 to convert the analog signal of the azimuth outputted by the Gyro sensor 21 into digital signal $\theta$ for computing by the controller 3.

The vehicle speedometer 22 frequently outputs a vehicle speed signal V indicating the current speed of the vehicle M relative to the global coordinate system. The vehicle speed signal V includes a series of pulse signals. The frequency of the series of pulse signals is directly proportional to the current speed of the vehicle M relative to the global coordinate system.

The controller 3 is electrically connected to the GPS 11, the Gyro sensor 21, and the vehicle speedometer 22. The memory device 12 is electrically connected to the controller 3, and adapted to store the accurate coordinates A, which will be described further, and a reference distance r. The memory device 12 can be, for example, a flash memory built in the controller 3.

The adjusting device 4 is electrically connected to the controller 3, and adapted to edit the reference distance r in the memory device 12, so as to adjust the precision of the accurate positioning system. The adjusting device 4 may be a wired input device, a wireless input device such as an infrared transmitter and receiver module means, an input port such as a USB plug, or a wireless receiver for receiving update data from a GPRS cell phone wirelessly. In accordance with this embodiment, the adjusting device 4 is a keypad installed into the dashboard inside the vehicle M.

The display screen 51 and the electronic map database (e-Map database) 23 are respectively and electrically connected to the controller 3. The electronic map database 23 has stored therein multiple road map data. The controller 3 reads in the road map data from the electronic map database 23 corresponding to the accurate coordinates A, and outputs the road map data to the display screen 51 for display. These road map data in the electronic map database 23 include the names of multiple roads and the coordinates of the starting points and end points of the roads. These road map data further include multiple road links and surrounding facilities corresponding to the names of the multiple roads.

Figure 4:
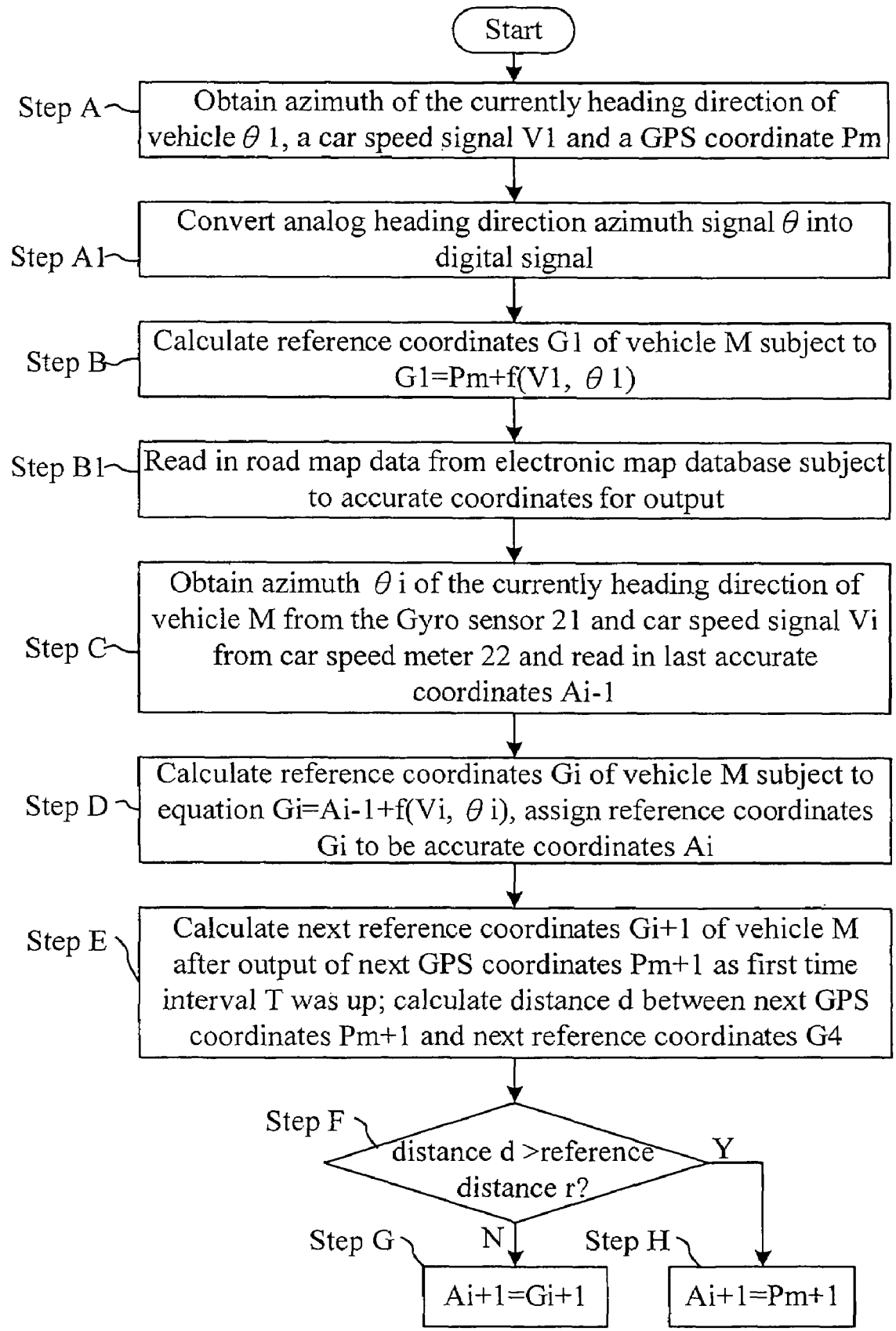
FIG. 4 is a flow chart of the present invention.
Figure 5:
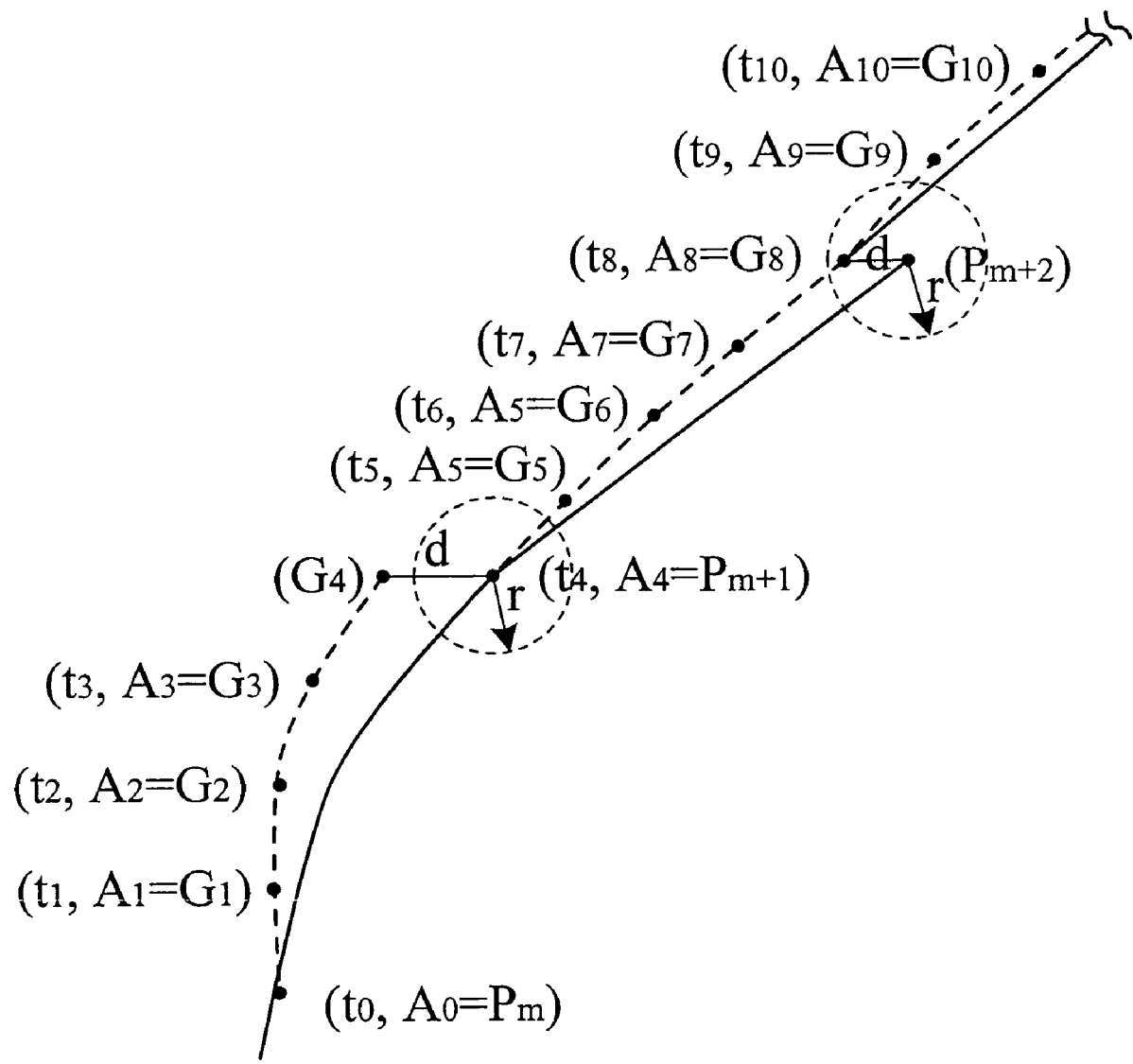
FIG. 5 is a schematic drawing showing the GSP coordinates and accurate coordinates of the vehicle at different time points in accordance with the present invention.

FIG. 3 shows the content of the accurate coordinates A of the vehicle M calculated by the controller at different time points (t0~t10). FIG. 4 is a flow chart of the present invention. FIG. 5 is a schematic drawing showing the vehicle positions at different time points in accordance with the present invention. When at the time point t0, the controller 3 starts to calculate the accurate coordinates of the vehicle M. At this time point t0, the GPS 11 outputs the GPS coordinate Pm as the accurate coordinates A0 of the vehicle M at the time point t0. When at the time point t1, the controller 3 fetches the azimuth $\theta 1$ of the currently heading direction of the vehicle M from the Gyro sensor 21 and the vehicle speed signal V1 from the vehicle speedometer 22 and reads in the GPS coordinate Pm from the GPS 11 (Step A), and then converts the analog heading direction azimuth signal into digital signal (Step A1), and then calculates the reference coordinates G1 of the vehicle M subject to equation $G1=Pm+f(V1, \theta 1)$ (Step B). Thereafter, the controller 3 assigns the reference coordinates G1 to be the accurate coordinates A1 at the time point t1 for output. The controller 3 reads in the road map data from the electronic map database 23 subject to the accurate coordinates A1, and outputs the road map data (Step B1).

Thereafter, the controller 3 fetches the azimuth $\theta i$ (i=2, 3, 4 . . . , j) of the currently heading direction of the vehicle M from the Gyro sensor 21 and the vehicle speed signal Vi from the vehicle speedometer 22 and reads in the previous accurate coordinates Ai-1 (Step C), and then calculates the reference coordinates Gi of the vehicle M subject to equation $Gi=Ai-1+f(Vi, \theta i)$ (i=2, 3, 4 . . . , j) (Step D), in which the second time interval t is shorter than the first time interval T. In accordance with this embodiment, the second time interval t is 0.25 second. The controller 3 assigns the reference coordinates Gi to be the accurate coordinates Ai at the corresponding time point and outputs the reference coordinates Gi, i.e., when at the time point t2, the controller 3 fetches the azimuth $\theta 2$ of the current heading direction of the vehicle M from the Gyro sensor 21 and the vehicle speed signal V2 from the vehicle speedometer 22 and reads in the last accurate coordinates A1, and then calculates the reference coordinates G2 of the vehicle M subject to equation $G2=A1+f(V2, \theta 2)$. The controller 3 also assigns the reference coordinates G2 to be the accurate coordinates A2 at the corresponding time point, and outputs the data. When at the time point t3, the controller 3 works in the same way as at the time point t2.

When at the time point t4, after the GPS 11 has outputted the next GPS coordinates Pm+1 as the first time interval (one second) T has expired, the controller 3 fetches the next azimuth $\theta 4$ of the heading direction of the vehicle M from the Gyro sensor 21 and the next vehicle speed signal V4 from the vehicle speedometer 22 and reads in the previous accurate coordinates A3, and then calculates the reference coordinates G4 of the vehicle M subject to equation $G4=A3+f(V4, \theta 4)$, and then the controller 3 calculates the distance d between the next GPS coordinates Pm+1 and the next reference coordinates G4 (step E). Thereafter, the controller 3 compares the distance d to the reference distance r to be greater than the reference distance r or not (Step F). If the distance d is greater than the reference distance r, it means the error has surpassed the tolerance radius r. To avoid error, the controller 3 assigns the next GPS coordinates Pm+1 to be the next accurate coordinates A4 for correction, and outputs the data. In accordance with this embodiment, the aforesaid reference distance r is 25 meters. This reference distance r can be adjusted to 5 meters, 10 meters, or 50 meters by means of the adjusting device 4 when desired.

When the next first time interval T has expired, i.e., when at the time point t8, the controller 3 compares the reference distance d to be shorter or equal to the reference distance r, it means the error is within the tolerance radius r, and therefore no correction is necessary. Thus, the controller 3 directly assigns the next reference coordinates G8 to be the next accurate coordinates A8 for output.

FIG. 5 shows the GPS coordinates Pm, Pm+1 and Pm+2 as well as the accurate coordinates A0~A8 at the time points t0~t10. As shown in FIG. 5, the GPS of the prior art GPS navigation system outputs GSP coordinates at time points t0, t4 and t8 only. By means of the Gyro sensor 2 and the vehicle speedometer 22, the invention shows the accurate coordinates A0~A10 at time points t0~t10.

As indicated above, the GPS of the prior art GPS navigation system outputs the current heading direction of the vehicle once per every second. When the vehicle is running at a high speed, the one-second time interval will result in a big error. By means of the Gyro sensor 21 and the vehicle speedometer 22, the invention calculates and outputs the coordinates of the currently heading direction of the vehicle once per every 0.25 second, enabling the position of the vehicle to be accurately displayed on the display screen 51. Further, the invention compares the GPS coordinates outputted by the GPS 11 to the reference coordinates calculated subject to the azimuth of the heading direction of the vehicle obtained from the Gyro sensor 21 and the vehicle speed signal obtained from the vehicle speedometer 22, and uses the GPS coordinates as the next accurate coordinates when the distance d of the comparison result surpasses the tolerance radius r. Therefore, the invention frequently corrects the coordinates of the vehicle, avoids the problem of receiving no GPS satellite signal as the vehicle is passing through a tunnel, and eliminates errors of the Gyro sensor 21 and the vehicle speedometer 22 due to the earth's rotation, so that the vehicle carrying the accurate positioning system of the present invention can obtain the most accurate position.

Although the present invention has been explained in relation to its preferred embodiments, it is to be understood that many other possible modifications and variations can be made without departing from the spirit and scope of the invention as hereinafter claimed.

What is claimed is:

1. An accurate positioning system installed in a vehicle, comprising:
   a GPS (Global Positioning System), the GPS outputting current first, second, third, etc GPS coordinates of the vehicle in that order once per every first time interval;
   a Gyro sensor, the Gyro sensor outputting azimuth signals indicative of the currently heading direction of the vehicle;
   a vehicle speedometer, the vehicle speedometer outputting vehicle speed signals indicative of the current speed of the vehicle; and
   a controller electrically connected to the GPS, the Gyro sensor, and the vehicle speedometer;
   wherein:
      the controller obtains a first azimuth signal from the Gyro sensor, a first vehicle speed signal from the vehicle speedometer, and reads in first GPS coordinates outputted at the first time interval from the GPS to calculate first reference coordinates of the vehicle, wherein the controller refers to the first reference coordinates thus calculated as first accurate coordinates at a time of output of the first accurate coordinates;
      the controller obtains second azimuth signals from the Gyro sensor, second vehicle speed signals from the vehicle speedometer, and reads in the first accurate coordinates to calculate second reference coordinates of the vehicle, wherein the controller refers to the second reference coordinates thus calculated as second accurate coordinates at time of output of the second accurate coordinates;
      the controller calculates first, second, third, and fourth accurate coordinates in that order once per second time interval, wherein the second time interval is shorter than the first time interval;
      after the GPS has outputted second GPS coordinates as the first time interval expires, the controller calculates the fourth reference coordinates of the vehicle, wherein the controller further calculates a distance between the second GPS coordinates and the fourth reference coordinates, and then compares the calculated distance to a reference distance, and then refers to the second GPS coordinates as fourth accurate coordinates for output when the calculated distance is greater than the reference distance, or refers to the fourth reference coordinates as the fourth accurate coordinates for output when the calculated distance is smaller than the reference distance.

2. The accurate positioning system as claimed in claim 1, further comprising an analog-to-digital converter electrically connected between the Gyro sensor and the controller and adapted to convert outputted analog azimuth signals, indicative of the current heading direction of the vehicle, into digital signals.

3. The accurate positioning system as claimed in claim 1, wherein the vehicle speed signals of the vehicle speedometer includes a series of pulse signals, the series of pulse signals having a frequency directly proportional to the current running speed of the vehicle.

4. The accurate positioning system as claimed in claim 1, wherein the controller comprises memory means having stored therein the accurate coordinates and the reference distance.

5. The accurate positioning system as claimed in claim 4, further comprising an adjusting device electrically connected to the controller and adapted to edit the reference distance in the memory means.

6. The accurate positioning system as claimed in claim 5, wherein the adjusting device is a keypad.

7. The accurate positioning system as claimed in claim 1, further comprising a display screen and an electronic map database both electrically connected to the controller, the electronic map database having stored therein multiple road map data, wherein the controller reads in road map data from the electronic map database relative to the accurate coordinates, and outputs the read road map data to the display screen for display.

8. The accurate positioning system as claimed in claim 7, wherein the multiple road map data of the electronic map database include names of multiple roads and the coordinates of starting points and ending points of the multiple roads.

9. The accurate positioning system as claimed in claim 8, wherein the multiple road map data further includes multiple road links and multiple surrounding facilities corresponding to the names of multiple roads.

10. The accurate positioning system as claimed in claim 1, wherein the first time internal is one second, and the second time interval is 0.25 seconds.

11. An accurate vehicle positioning method comprising the steps of:
   A) obtaining a current azimuth of a heading direction of a vehicle, a current vehicle speed signal, and current GPS coordinates, wherein the azimuth is outputted by a Gyro sensor installed in the vehicle, further wherein the vehicle speed signal is outputted by a vehicle speedometer installed in the vehicle, and further wherein the GPS coordinates are outputted by a GPS (Global Positioning System) installed in the vehicle, the GPS coordinates outputted once per every first time interval;

B) calculating first GPS coordinates of the vehicle and referring to the GPS coordinates as first accurate coordinates at a first time interval;

C) next, obtaining the current azimuth of the current heading direction of the vehicle from the Gyro sensor and the current vehicle speed signal from the vehicle speedometer and reading in the first accurate coordinates to calculate second accurate coordinates after a second time interval, wherein the second time interval is shorter than the first time interval;

D) next, obtaining the current azimuth of the current heading direction of the vehicle from the Gyro sensor and the current vehicle speed signal from the vehicle speedometer and reading in the second accurate coordinates to calculate third accurate coordinates after a next second time interval, wherein the next second time interval is shorter than the first time interval;

E) next, obtaining the current azimuth of the current heading direction of the vehicle from the Gyro sensor and the current vehicle speed signal from the vehicle speedometer and reading in the third accurate coordinates to calculate fourth reference coordinates after a next second time interval, wherein the next second time interval is shorter than the first time interval;

F) next, outputting second GPS coordinates at expiry of a next first time interval, and then calculating a distance between the second GPS coordinates and the fourth reference coordinates; and G) next, comparing the calculated distance between the second GPS coordinates and the fourth reference coordinates to a reference distance to determine if the calculated distance is greater or smaller than the reference distance, and referring to the second GPS coordinates as the fourth accurate coordinates when the calculated distance between the second GPS coordinates and the fourth reference coordinates is greater than the reference distance, and outputting the fourth accurate coordinates.

12. The accurate vehicle positioning method as claimed in claim 11, wherein when the calculated distance between the second GPS coordinates and the fourth reference coordinates is smaller than or equal to the reference distance after comparison during step G), assigning the fourth reference coordinates to be the fourth accurate coordinates and outputting the fourth accurate coordinates.

13. The accurate vehicle positioning method as claimed in claim 11, further comprising a sub step A1) of converting the analog signal of the azimuth of the heading direction of the vehicle into a digital signal after step A) and before step B).

14. The accurate vehicle positioning method as claimed in claim 13, wherein the sub step A1) is to use an analog-to-digital converter to convert the analog signal of the azimuth of the heading direction of the vehicle into a digital signal.

15. The accurate vehicle positioning method as claimed in claim 11, further comprising a sub step B1) of reading in a road map data from an electronic map database subject to the first accurate coordinates and outputting the road map data after step B) and before step C).

* * * * *